July 18, 1961
C. E. HOWARD, SR
2,992,781
TANK WASHING DEVICE
Filed May 19, 1958
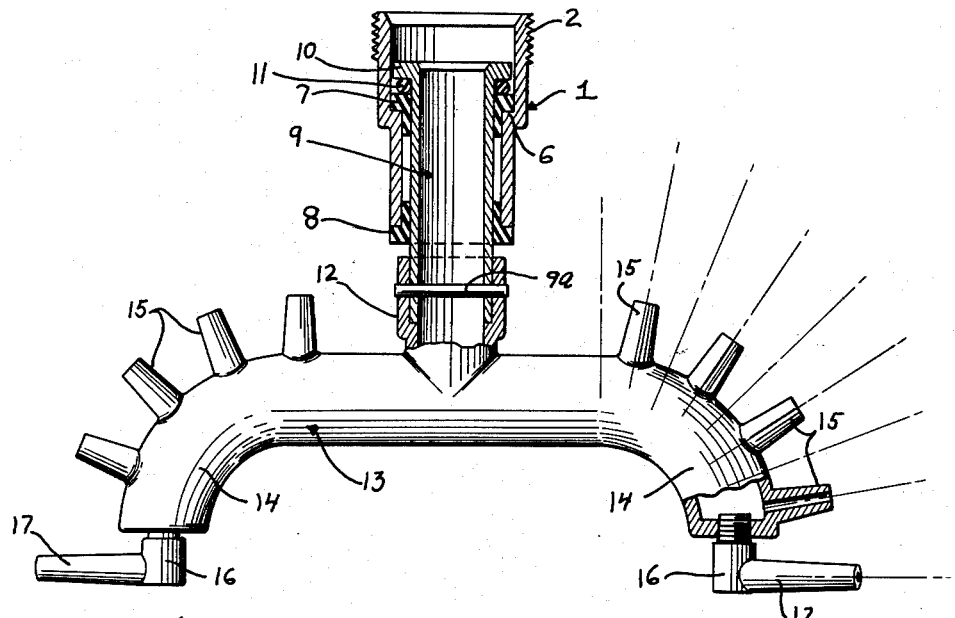
FIG. 1
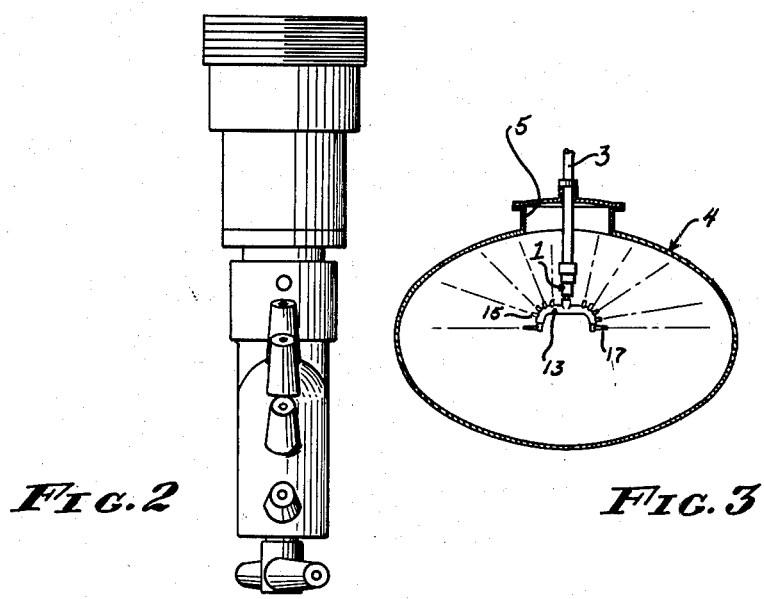
FIG. 2
FIG. 3
INVENTOR.
CECIL E. HOWARD SR
BY
ATTORNEYS

United States Patent Office 2,992,781
Patented July 18, 1961

2,992,781
TANK WASHING DEVICE
Cecil E. Howard, Sr., San Marino, Calif., assignor to C. E. Howard Corporation, South Gate, Calif., a corporation of California
Filed May 19, 1958, Ser. No. 736,128
2 Claims. (Cl. 239—250)

This invention relates to tank washing devices, more particularly to washing devices especially adapted to clean tanks used in the transportation of milk. When milk is transported in tanks a continuous splashing of the milk against the upper side of the tank above the normal level of the milk occurs. The wetting, partial drying, and rewetting of the said tank surface causes a hard, tenacious coating to form on the surfaces of the tank above the normal liquid level. This coating forms a medium in which bacteria develop; therefore, its complete, periodic removal is essential.

A primary object of this invention is to provide a tank washing device which may be suspended within a tank, and which is provided with a plurality of jet orifices so oriented that streams of cleansing or rinsing liquid may be directed against all portions of the tank surface above the normal liquid level to remove completely any coatings or incrustations.

A further object is to provide a tank washing device which involves a minimum number of parts and which is dependable in operation.

With the above and other objects in view, as may appear hereinafter, reference is directed to the accompanying drawings in which:

FIGURE 1 is a partial sectional, partial side view of the tank washing device;

FIGURE 2 is an end view thereof;

FIGURE 3 is a substantially diagrammatical view showing the manner in which the device is suspended within a tank to be cleaned.

The tank washing device includes a suspension sleeve 1 which is provided with external screw threads 2 at its upper end for connection to a suspension pipe 3 adapted to be lowered into a tank 4 through a suitable access opening 5.

The suspension sleeve 1 is provided with an internal shoulder 6 and is fitted with upper and lower bearing bushings 7 and 8, the upper bushing having a flange overlying the shoulder 6 and the lower bushing having a flange underlying the lower end of the suspension sleeve.

The bearing bushings 7 and 8 journal a tubular stem 9 having a flange 10 at its upper end overlying the upper bearing bushing 7. Interposed between the flange 10 and the upper bearing bushing 7 is a combination drag and seal ring 11 made of rubber or synthetic rubber which may be a conventional O-ring. The upper bearing bushing is preferably made of tetrafluoroethylene known commercially as Teflon, or similar material. The bearing bushing and drag ring provide limited frictional resistance to turning of the sleeve to limit the rate of rotation of the nozzle mainfold, to be described hereinafter. The lower end of the tubular stem 9 protrudes from the suspension sleeve 1 and telescopes within an upstanding mounting boss 12, centrally located on a rotor body or nozzle manifold 13, and is secured thereto by a cross pin 9a.

The nozzle manifold 13 is a tubular member having down curved end portions 14. These end portions 14 are provided with upwardly directed, radiating nozzles 15 which form acute angles with the axis of the tubular stem 9. The nozzles radiating from each end portion 14 are disposed at staggered distances from the tubular stem 9, and the angular relation of the nozzles with the stem increase with their distance from the stem, as indicated by the radiating broken lines in FIGURE 1. That is, the nearest nozzle may be substantially parallel with the stem, whereas the most remote nozzle near the extremities of the down curved end portions 14 approach a horizontal direction.

The extremities of the down curved end portions 14 are closed, and each receives a screw-threaded fitting 16. Each screw-threaded fitting is provided with a horizontally directed reaction nozzle 17, which extends along an axis displaced from the axis of the tubular stem 9 so that upon discharge of water or fluid from the reaction nozzles a reaction torque is applied to the stem and the nozzle manifold 13 to cause rotation.

Operation of the tank washing device is as follows:
The washing device may be located permanently within a tank or may be lowered therein through the access opening 5. In the process of cleaning a tank, various liquids are forced through the device, such as chemicals which will dissolve or otherwise remove incrustations, disinfectants, or rinsing water. As the nozzle manifold 13 rotates, each of the nozzles discharge water or other liquid in a path which generates a conical figure. By reason of the fact that the nozzles are disposed in different angular relation with the axis of rotation, the jets of water or cleansing fluid are directed against the upper walls of the tank at increasing distances from the axis of the washing device. The water or cleansing fluid is discharged at relatively high pressure and velocity so that incrustations are loosened from the upper portions of the tank.

As has been pointed out previously, the tank washing device is particularly intended for the washing of tanks used to store and transport milk. It will be observed that the nozzles are directed primarily against the upper half of the tank, that is, against those portions of the tank which are above the normal milk level and are subject to alternate depositing and drying of the milk. It is not necessary to direct the nozzles to the lower portion of the tank, as incrustation does not normally occur in this region and complete cleaning of the tank can be obtained by the drainage of water and cleansing fluid down the lower surfaces of the tank.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A tank washing device, comprising: a supporting sleeve having means for connection to a mounting pipe to dispose the supporting sleeve within a tank; a bushing means therein formed of temperature and chemical-resistant plastic material; a tubular stem journaled in said bushing means and including a flange overlying said bushing means; a combined sealing and drag ring interposed between said flange and bushing means; a manifold member carried by said stem for rotation therewith, said manifold member including curved ends, each defining a quarter circle, and a plurality of integral nozzle stems extending radially from the convex sides of said ends and disposed at different angles; and reaction nozzles at the circumferential extremities of said downturned ends.

2. A tank washing device, comprising: a supporting sleeve having means for connection to a suspension pipe to dispose the supporting sleeve within a tank; a bushing means therein formed of temperature and chemical-resistant plastic material; a tubular stem journaled in said bushing means and including a flange overlying said bushing means; a combined sealing and drag ring interposed between said flange and bushing means; a manifold member carried by said stem for rotation therewith, said manifold member including downturned ends, each curved to define a quarter circle, and a plurality of integral nozzle stems extending radially from the convex sides of said ends and disposed at different angles; and reaction nozzles at the circumferential extremities of said downturned ends.

References Cited in the file of this patent

UNITED STATES PATENTS

| | | |
|---|---|---|
| 1,737,257 | Merseles | Nov. 26, 1929 |
| 2,013,387 | Johnston | Sept. 3, 1935 |
| 2,021,962 | Marsh | Nov. 26, 1935 |
| 2,030,194 | Bell | Feb. 11, 1936 |
| 2,602,003 | Wellborn | July 1, 1952 |
| 2,726,897 | Dupont | Dec. 13, 1955 |
| 2,766,065 | Joyslen | Oct. 9, 1956 |
| 2,787,499 | Rolston | Apr. 2, 1957 |
| 2,853,342 | Kachergis | Sept. 23, 1958 |
| 2,858,836 | Geb et al. | Nov. 4, 1958 |
| 2,878,062 | Crow | Mar. 17, 1959 |

FOREIGN PATENTS

| | | |
|---|---|---|
| 349,184 | Great Britain | May 28, 1931 |